(12) United States Patent
Marukawa et al.

(10) Patent No.: US 6,287,175 B1
(45) Date of Patent: Sep. 11, 2001

(54) METHOD OF MIRROR-FINISHING A GLASS SUBSTRATE

(75) Inventors: Takabumi Marukawa; Naoyuki Hamada; Kanichi Endo, all of Tokyo (JP)

(73) Assignee: Nihon Micro Coating Co., Ltd. (JP)

( * ) Notice: Subject to any disclaimer, the term of this patent is extended or adjusted under 35 U.S.C. 154(b) by 0 days.

(21) Appl. No.: 09/598,545

(22) Filed: Jun. 21, 2000

(30) Foreign Application Priority Data

Jul. 1, 1999 (JP) .................................................. 11-187208

(51) Int. Cl.$^7$ ........................................................ B24B 1/00
(52) U.S. Cl. ................................ 451/41; 451/57; 451/59; 451/60
(58) Field of Search .................................. 451/41, 28, 59, 451/63, 60, 42

(56) References Cited

U.S. PATENT DOCUMENTS

| | | | |
|---|---|---|---|
| 4,393,628 | * | 7/1983 | Ottman et al. ............... 51/281 SF |
| 5,307,593 | * | 5/1994 | Lucker et al. ............... 51/281 SF |
| 5,486,134 | * | 1/1996 | Jones et al. ............... 451/209 |
| 5,573,444 | | 11/1996 | Ryoke et al. . |
| 5,645,471 | * | 7/1997 | Strecker ............... 451/59 |
| 5,899,794 | * | 5/1999 | Shige et al. ............... 451/451 |
| 5,913,712 | * | 6/1999 | Molinar ............... 451/41 |
| 6,123,603 | * | 9/2000 | Tada et al. ............... 451/37 |

FOREIGN PATENT DOCUMENTS

| | | |
|---|---|---|
| 7-314324 | 12/1995 | (JP) . |
| 9-155732 | 6/1997 | (JP) . |
| 10-130634 | 5/1998 | (JP) . |

* cited by examiner

*Primary Examiner*—Timothy V. Eley
*Assistant Examiner*—Dung Van Nguyen
(74) *Attorney, Agent, or Firm*—Coudert Brothers

(57) ABSTRACT

A mirror-finishing method embodying this invention, with which the above and other objects can be accomplished, may be characterized as comprising the step of supplying a solution containing hydroxyl groups on a target surface to be polished of a glass substrate while simultaneously pressing onto this target surface an elastic sponge material having abrading particles affixed therein and a plurality of indentations on a polishing surface thereof, and causing the substrate and the sponge material to move with respect to each other.

4 Claims, 4 Drawing Sheets

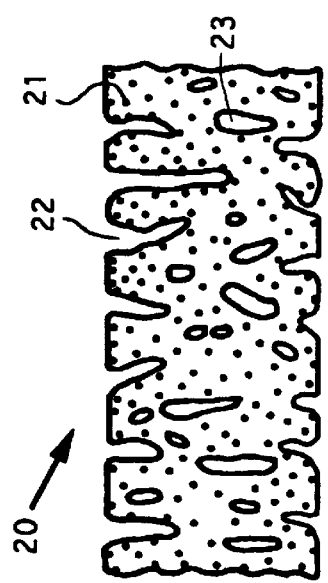
FIG._5 (PRIOR ART)
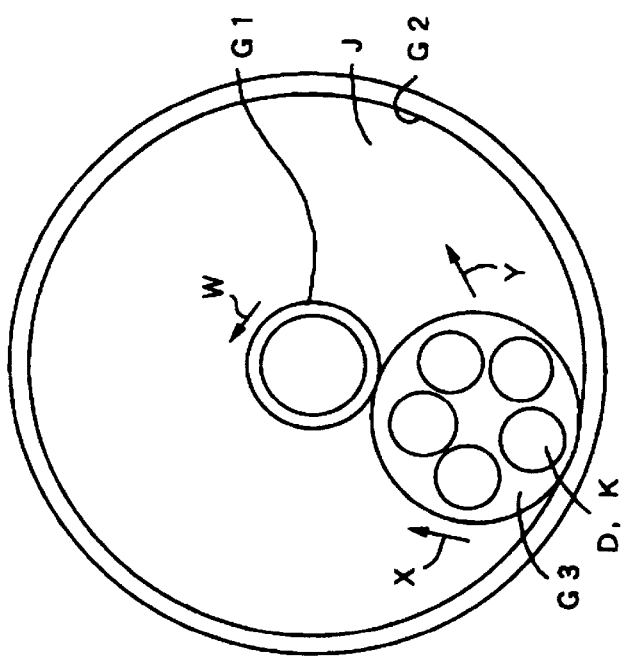
FIG._1a
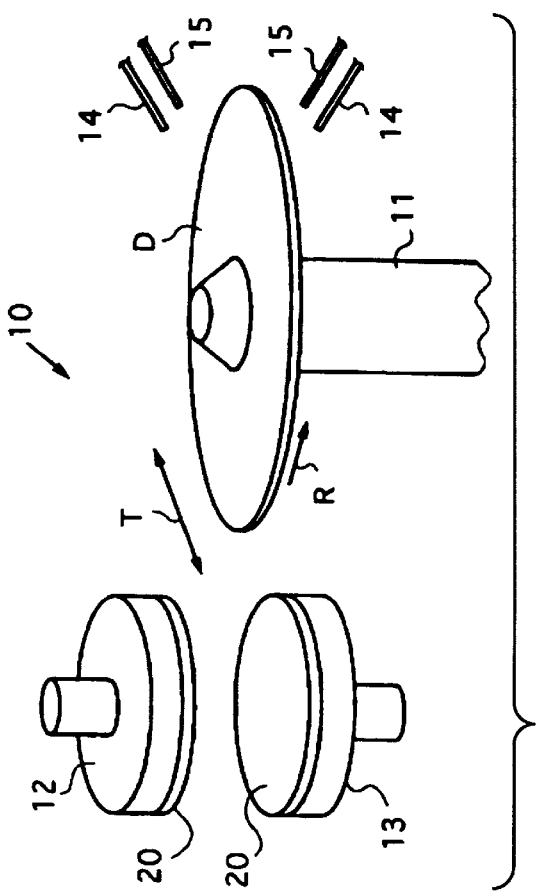
FIG._1b

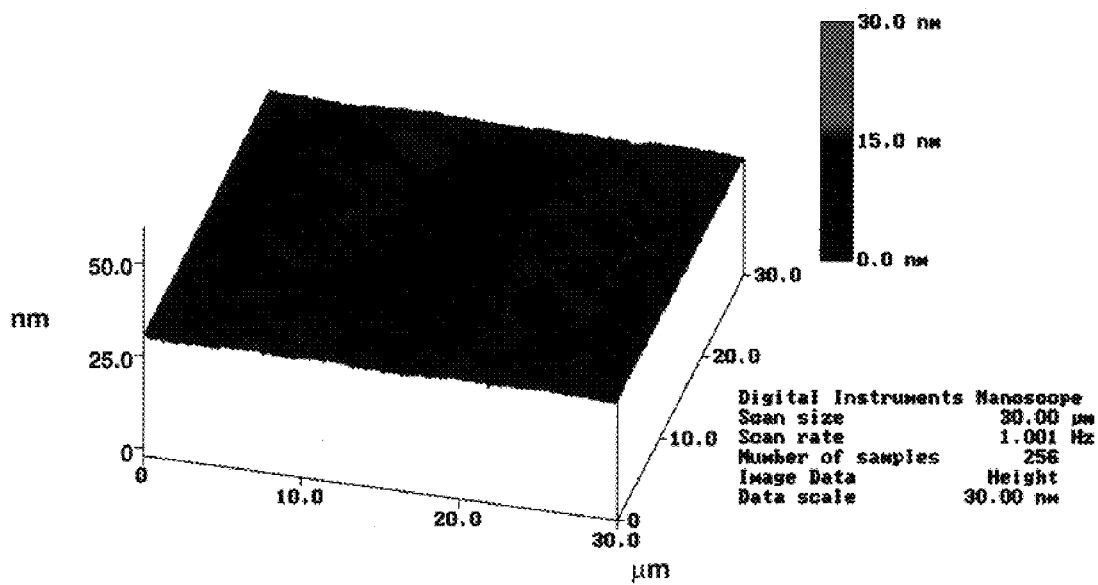
FIG._2

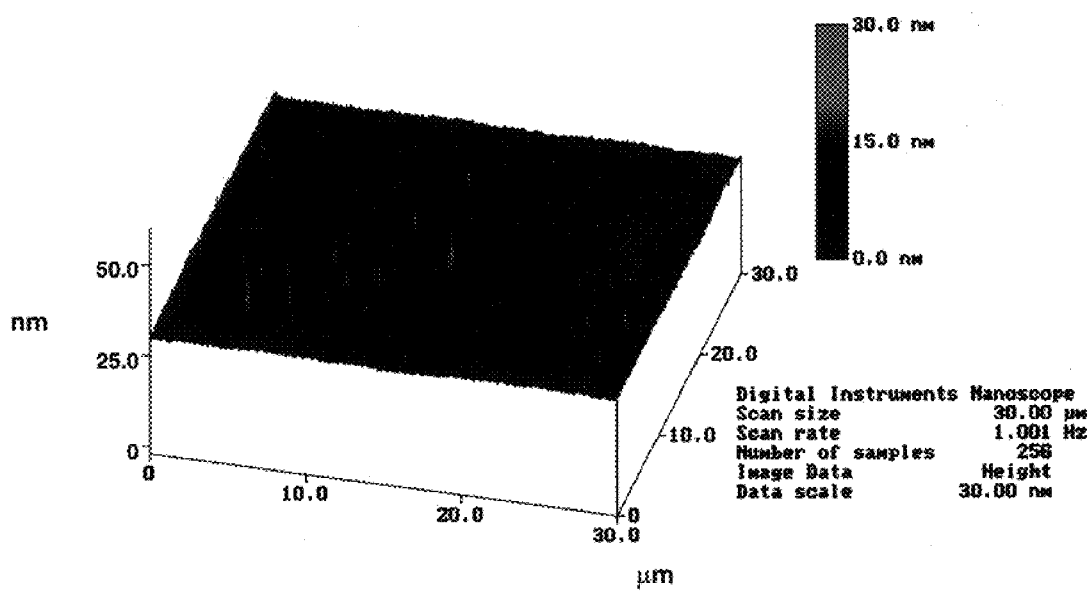
FIG._3

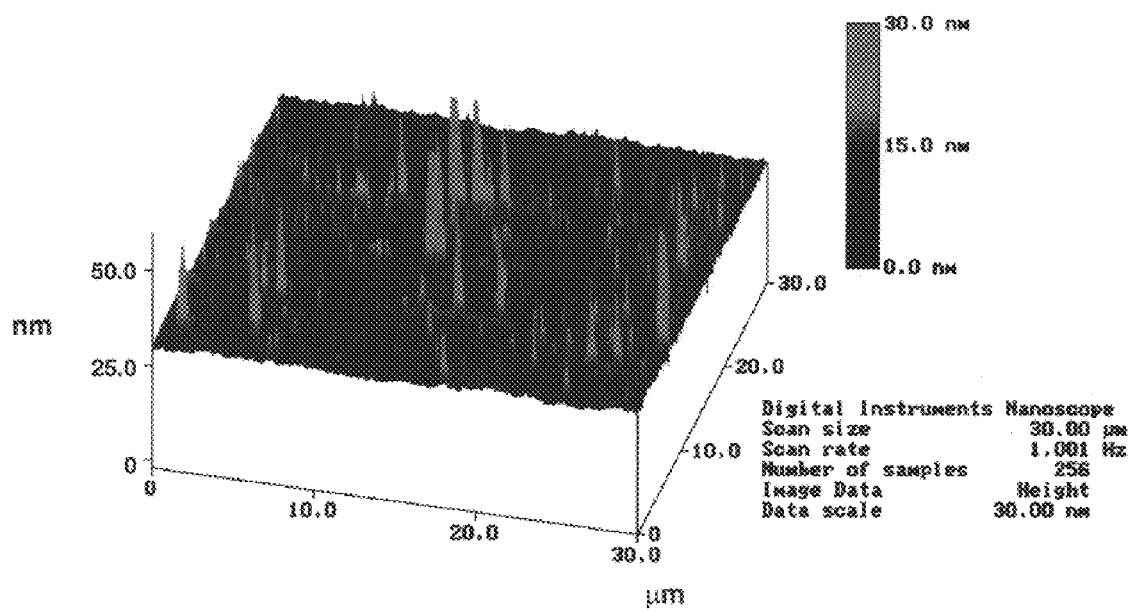
FIG._4

METHOD OF MIRROR-FINISHING A GLASS SUBSTRATE

BACKGROUND OF THE INVENTION

This invention relates to a method of mirror-finishing the surface of a glass substrate for a magnetic disk or a liquid crystal panel for which a high level of smoothness is required.

In general, the surface of a glass substrate for a magnetic disk or the like is mirror-finished by a mechanical polishing method through direct grinding with the use of fixed or free abrading particles or by a chemical polishing method which makes use of a chemical reaction on the surface of the glass substrate which is thereafter washed and rinsed to be presented as a finished product. Mechanical polishing by means of fixed abrading particles is carried out by pressing a pad or a tape (hereinafter simply referred to as the "pad") having abrading particles affixed to its surface to the target surface of the glass substrate while supplying a coolant and causing the pad to move relative to the substrate surface. Mechanical polishing by means of free abrading particles is carried out by pressing the pad onto the target surface of the glass substrate while supplying a slurry (or a suspension containing abrading particles) and again by causing the pad to move relative to the substrate surface.

By either of these mechanical polishing methods, abrading particles with average diameter of 0.01 $\mu$m–5 $\mu$m are used for grinding the target surface of a glass substrate for obtaining a mirror-finished surface. At the present time, however, it is technologically very difficult to obtain abrading particles with uniform sizes and shapes, and there are always significant variations in the sizes and shapes among the abrading particles which are used. For this reason, protrusions with height differences about 100 Å are usually formed on the abraded surface of a glass substrate. FIG. 4 shows the surface of a glass substrate with the maximum height of protrusion 259.4 Å after it was polished by a mechanical polishing process by means of a polishing tape with a polishing layer having diamond particles with average diameter of 0.7 $\mu$m affixed to its surface.

Chemical polishing, by contrast, is carried out by causing a solid phase reaction on the contact boundary surface between the abrading particles and the surface of the glass substrate to thereby generate a different substance on this contact boundary surface and then removing this portion of the contact boundary surface chemically and mechanically. Since a chemical reaction is relied upon by such a process, the deterioration or degradation of the substrate surface is extremely unlikely and fine polishing is possible since the unit area of processing is extremely small.

FIG. 5 shows a polishing machine which may be used for carrying out a chemical polishing process in a batch style in a so-called four-way operation. Disk substrates D are inserted into openings K provided in a planet gear G3 which is placed on a donut-shaped lower lapping plate J, being engaged both with an internal gear G2 on the outer (internally facing) periphery and a sun gear G1 at the center. The disk substrates D are pressed from above by an upper lapping plate (not shown) which is of the same shape as the lower lapping plate J and is provided with a plurality of openings. The chemical polishing process is carried out by supplying a slurry through these openings in the upper lapping plate, causing the upper and lower lapping plates to rotate in mutually opposite directions such that the sun gear G1 will rotated as shown by arrow W and the planet gear G3 will rotated not only around itself as shown by arrow X but also around the sun gear G1 as shown by arrow Y.

By such a chemical mechanical method of polishing by means of a double-side polishing machine, however, the abrading particles in the slurry and the glass substrate remain in a mutually contacting relationship after the polishing machine is stopped until the glass substrate is washed. Thus, a solid-phase reaction takes place on the contacting surface between the abrading particles and the glass substrate in the meantime, thereby generating unwanted substances which cannot be removed by the washing process. As a result, protrusions of hydrophilic glass with height about 100 Å appears scattered over the substrate surface, as shown in FIG. 3.

SUMMARY OF THE INVENTION

It is therefore an object of this invention to provide a method of mirror-finishing a glass substrate to be used for a magnetic disk or a liquid crystal panel such that a surface with a high degree of flatness can be obtained, eliminating the protrusions of hydrophilic glass from the substrate surface.

A mirror-finishing method embodying this invention, with which the above and other objects can be accomplished, may be characterized as comprising the step of supplying a solution containing hydroxyl groups on a target surface to be polished of a glass substrate while simultaneously pressing onto this target surface an elastic sponge material having abrading particles affixed therein and a plurality of indentations on a polishing surface thereof, and causing the substrate and the sponge material to move with respect to each other.

The solution containing hydroxyl groups serves not only to accelerate the chemical polishing of the target surface by a solid phase reaction caused over the contact surfaces between the abrading particles affixed in the sponge material and the target surface but also as a coolant for absorbing the heat of friction generated between the sponge material and the glass substrate. Solutions of potassium hydroxide and sodium hydroxide may be used as the solution containing hydroxyl groups for the purpose of this invention.

The sponge material is not only elastic but provided with many indentations on its surface. As it is pressed against the target surface to be polished and moved with respect thereto, debris particles generated by the grinding are taken into these indentations. Since the sponge material is being pressed to the target surface elastically in the meantime, the abrading particles do not damage the target surface by grinding it to an excessive degree. Abrading particles of a known kind such as particles of rare-earth material such as cerium oxide and manganese oxide may be used for the purpose of this invention. The sponge material may be in the shape of a pad or a tape. If the sponge material is used in the shape of a tape, it may be adhesively attached to a plastic film of polyester or polyvinyl chloride as its backing so as to prevent damage to the sponge material due to a tensile stress.

After the grinding process, a washing liquid is supplied to the target surface from the same nozzle through which the solution was supplied during the grinding process. In other words, the washing process can be carried out by using the same polishing machine continuously. Still thereafter, water may be supplied similarly for rinsing.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1(a) is a sketch of a disk washing machine which may be used for mirror-finishing a substrate surface by a method embodying this invention, and FIG. 1(b) is an enlarged sectional view of a portion of the pads;

FIG. 2 is a digital photograph of a surface of a glass substrate after being mirror-finished by a method of this invention;

FIG. 3 is a digital photograph of a surface of a glass substrate after being mirror-finished by a chemical mechanical polishing method but before a mirror-finishing process by a method of this invention;

FIG. 4 is a digital photograph of a surface of a glass substrate after a mechanical mirror-finishing process; and FIG. 5 is a sketch of a double-face polishing machine for chemical mechanical polishing which may be used for a method of this invention.

DETAILED DESCRIPTION OF THE INVENTION

FIG. 1(a) shows a washing machine 10 which may be used for mirror-finishing both surfaces of a glass substrate of a magnetic disk by a method embodying this invention. As schematically shown, this washing machine 10 is provided with a spindle 11 for having a glass substrate D affixed to it and rotating it in the direction indicated by arrow R, a pair of pad plates 12 and 13 which are aligned in a mutually face-to-face relationship a pair of nozzles 14 for supplying a solution containing hydroxyl group, and another pair of nozzles 15 for supplying a washing liquid. Each of the pair of pad plates 12 and 13 has adhesively attached to it a sponge material 20 having abrading particles affixed to it (referred to as the "pad"). The pair of paid plates 12 and 13 is attached to a pair of arm members (not shown) disposed one above the other and connected to a driving mechanism of a known kind including a motor (not shown) such that they can be moved reciprocatingly as shown by arrows T so as to be on the glass substrate or be retracted therefrom or the pads 20 thereon can be pressed against the surfaces of the glass substrate D. The distance by which the pad plates 12 and 13 are separated is made adjustable such that each of the pads 20 can be pressed against a surface of the glass substrate D until it becomes slightly indented by the pressure of compression. The pads 20 may comprise a sponge material with Shore hardness equal to about 20–50 degrees and a plurality of holes opening up on its surface, having abrading particles affixed to it.

The pads 20 may comprise foamed polyurethane with abrading particles 21 dispersed and affixed therein as shown in FIG. 1(b). Such a pad 20 can be obtained by adding water and abrading particles when isocyanate is reacted with polyester having functional hydroxyl groups, stirring the mixture well to disperse carbon dioxide gas and the abrading particles, and molding it into a shape with appropriate thickness of about 0.1 mm–100 mm after it hardens. Some of the gas bubbles 23 are exposed to the exterior, resulting in indentations 22 which are scattered over the surfaces. Examples of the abrading particles which may be used include particles of rare-earth materials such as cerium oxide and manganese oxide with average diameter of 0.1–5 $\mu$m which are commonly used for grinding.

A mirror-finishing process according to this invention may be carried out by rotating the glass substrate D affixed to the spindle 11 in the direction of R and pressing the pads 20 thereonto from both sides while supplying a solution containing hydroxyl groups on both surfaces of the glass substrate D through the nozzle 14. The protrusions on the surfaces of the glass substrate D are polished off chemically and mechanically by means of the solution containing hydroxyl groups and the debris particles thereby generated (including both particles which have been scraped off and parts of the abrading particles) are taken into the indentations 22 on the surfaces of the sponge material. Since the sponge material is elastic, the abrading particles do not grind the substrate surfaces excessively or otherwise damage them.

Thereafter, the supply of the solution containing hydroxyl groups is stopped while the pads 20 are kept pressed against the rotating glass substrate D, and a washing liquid is supplied instead through the other nozzle 15. During this process, the pads 20 serve to wipe off the solution containing hydroxyl groups which still remains on the substrate surfaces and the debris particles are taken into the indentations of the sponge material. During this process, too, the substrate surfaces are not damaged or scratched excessively by the abrading particles 21 because the sponge material of the pads 20 is elastic. The pads 20 are retracted thereafter from the substrate surfaces while the substrate D keeps rotating and is rinsed with water.

The invention is described next by way of an actual test experiment carried out according to the invention to mirror-polish the surfaces of a glass substrate for a magnetic disk. The sample glass substrate was preliminarily polished by a chemical mechanical polishing process by using a two-way polisher shown in FIG. 5 with the sun gear rotated at 10 rpm, the upper lapping plate rotated at –10 rpm, the lower palling plate rotated at 30 rpm, the slurry being supplied at 50 ml/minute, the time of polishing being 10 minutes and the pressure applied for the polishing being 100 g/cm$^2$.

The average surface roughness after this chemical mechanical polishing process was measured by scanning (at 256 points) an arbitrarily selected surface area of 30 $\mu$m×30 $\mu$m by means of a scanning prove type microscope (Nanoscope 3100 series produced by Digital Instrument, Inc.). The measured average surface roughness Ra and the maximum height of protrusions were respectively 3.4 Å and 129.9 Å. The surface condition of this glass substrate at this moment was as shown by the digital photograph in FIG. 3, showing protrusions of hydrophilic glass of about 100 Å scattered over the surface.

Next, the surfaces of this glass substrate were mirror-finished according to a method embodying this invention by using a polishing machine described above with reference to FIG. 1(a). For this mirror-finishing process, the pads were pressed against both surfaces of the glass substrate while the glass substrate was rotated at 300 rpm and a solution of potassium hydroxide (with 95 weight % of pure water and 5 weight % of potassium hydroxide) was supplied at a flow rate of 150 ml/minute. After 30 seconds, the supply of the solution of potassium hydroxide was stopped, and the pads were pressed against the substrate surfaces for 30 seconds while pure water was supplied instead at the rate of 150 ml/minute. The pads were retracted thereafter from the substrate surfaces and the surfaces were rinsed with pure water which continued to be supplied to both surfaces of the rotating glass substrate.

For this process, a sponge material of polyurethane foam with thickness of 0.5 mm and having particles of cerium oxide with average diameter 0.7 $\mu$m dispersed and affixed therein was used as the pads to be adhesively attached to the pad plates. The areal density of the abrading particles inside the sponge material was 0.36 g/cm$^2$ and the Shore hardness of the sponge material was 32 degrees. These pads were pressed against the substrate surfaces to the extent that they were compressed by about 0.1 mm.

The average surface roughness of the glass substrate after this mirror-finishing process was measured by scanning (at 256 points) another arbitrarily selected surface area of 30 µm×30 µm by means of the same scanning probe type microscope. The measured average surface roughness Ra and the maximum height of protrusions were respectively 3.2 Å and 42.5 Å. The surface condition of this glass substrate after this mirror-finishing process was as shown by the digital photograph in FIG. 2, showing none of the protrusions of hydrophilic glass which were scattered all of prior to the mirror-finishing process.

This test experiment clearly shows that the average surface roughness of the glass substrate was reduced and the maximum height of the surface protrusions became significantly less. That the surface roughness did not change much means that the surfaces of the glass substrate were not ground excessively.

What is claimed is:

1. A method of mirror-finishing comprising the steps of:

supplying a solution containing hydroxyl groups on a target surface to be polished of a glass substrate;

simultaneously pressing onto said target surface an elastic sponge material having abrading particles affixed therein and a plurality of indentations on a polishing surface thereof;

simultaneously causing said substrate and said sponge material to move with respect to each other;

thereafter supplying a washing liquid instead of said solution onto said target surface while pressing onto said target surface said elastic sponge material having abrading particles affixed therein and a plurality of indentations on a polishing surface thereof and causing said substrate and said sponge material to move with respect to each other;

thereafter retracting said sponge material away from said target surface; and rinsing said target surface.

2. The method of claim 1 wherein said solution is a potassium hydroxide solution.

3. The method of claim 2 wherein said sponge material comprises polyurethane with thickness 0.1–100 mm and said abrading particles have an average diameter 0.1–5 µm and comprises a rare-earth material.

4. The method of claim 1 wherein said sponge material comprises polyurethane with thickness 0.1–100 mm and said abrading particles have an average diameter 0.1–5 µm and comprises a rare-earth material.

* * * * *